United States Patent Office 3,365,416
Patented Jan. 23, 1968

---

3,365,416
RUBBER COMPOSITION, PARTICULARLY INTENDED FOR TREADS OF PNEUMATIC TIRES
Sergio Vittorelli, Oberto Canonici, and Angelo Morando, Milan, Italy, assignors to Pirelli S.p.A., Milan, Italy
No Drawing. Filed Feb. 4, 1964, Ser. No. 342,526
Claims priority, application Italy, Feb. 16, 1963, 3,327/63, Patent 688,003
8 Claims. (Cl. 260—33.6)

The present invention relates to improved rubber compositions and to their application, in particular in pneumatic tires for wheels of motor vehicles.

In recent years, because of improved conditions of the roadways and of increased requirements by the users of motor vehicles, new features have been demanded in these tires.

While at first it was sufficient for pneumatic tires to have good resistance to abrasion and cracks, further features were required later on, such as a high friction coefficient in order to ensure a good holding of the road, even in wet conditions, both during braking and on curves, reduced noise, better riding comfort, and improved behavior of the motor vehicle, all these features being, of course, proportional to the ever increasing speed of the motor vehicles. Some of these new features were achieved or improved by means of suitable modifications to the structure of the pneumatic tire, as for instance to the carcass or to the tread, or to both elements. Other features can instead be achieved or improved only by means of modifications in the compositions, by virtue of an appropriate selection of the elastomers constituting them.

It is known in the rubber industry that, because of improved processes, 1,3-butadiene can be polymerized to form polymers containing monomeric units of cis 1,4-, trans 1,4- and 1,2-addition.

In the present specification the expression "polybutadiene cis 1,4-" means polybutadiene obtained by addition of 1,3-butadiene with monomeric units of cis 1,4-, trans 1,4- and 1,2-addition, in which cis 1,4-addition monomeric units are present in an amount of at least 30% by weight based on the total weight of the polymer.

Cis 1,4-polybutadiene has very good resistance to abrasion and to agents causing cracks, and is satisfactorily able to meet in these respects some of the substantial requirements concerned with its use in the treads of pneumatic tires.

However, tires in which the tread is constituted by vulcanized compositions completely or predominantly based on said elastomer, have a low friction coefficient and consequently reduced road holding, on dry and wet ground, both during braking and on curves.

It was tried to increase the friction coefficient of vulcanized compositions for treads based on said elastomer by the addition of particularly large amounts of carbon black and mineral oil.

In practice it was ascertained that in pneumatic tires the tread of which is constituted by a vulcanized composition based on cis 1,4-polybutadiene and containing the above ingredients in large amounts, the inconvenience of insufficient road holding was not eliminated, but only reduced.

It has now been found that it is possible to increase in a considerable measure the friction coefficient of the vulcanized compositions based on cis 1,4-polybutadiene, without compromising the advantageous features which are peculiar to said elastomer.

The object of the present invention is to provide a composition based on a mixture of elastomers comprising cis 1,4-polybutadiene and at least one other elastomer, which can be used in those applications for which, until the present time, cis 1,4-polybutadiene, alone, was unable to give fully satisfactory results.

A further object of the invention is to provide a pneumatic tire, in which at least the tread is constituted by said vulcanized composition.

According to the invention, the rubber composition is based on a mixture of elastomers comprising (1) from 10 to 90 parts by weight of polybutadiene obtained by addition of 1,3-butadiene and containing monomeric units of cis 1,4-, trans 1,4- and 1,2-addition, in which the cis 1,4-addition monomeric units are present in an amount of at least 30% by weight based on the total weight of the polymer, and (2) from 90 to 10 parts by weight of a butadiene-styrene copolymer extended with mineral oil, the ratio by weight between the two types of monomeric units (butadiene and styrene units) of said copolymer ranging between 13:7 and 2:3, and said oil being incorporated in an amount of at least 15% by weight based on the total weight of the polymer. The total of the parts by weight of the elastomeric components of the mixture is equal to 100.

Particularly satisfactory results are obtained with a composition based on a mixture comprising from 35 to 65 parts by weight of a polybutadiene obtained by addition of 1,3-butadiene and containing at least 90% of cis 1,4-addition monomeric units and from 65 to 35 parts by weight of a butadiene-styrene copolymer extended with mineral oil, in which the ratio by weight between the two types of monomeric units is 3:2 and the oil is incorporated in an amount of at least 20% on the weight of said copolymer.

The elastomers of polybutadiene containing cis 1,4-addition monomeric units in an amount of at least 30% by weight based on the total weight of the polymer and used in accordance with the present invention, are produced by means of processes widely known in the industry.

For the purposes of the present invention, any type of polybutadiene containing an amount greater than 30% by weight of cis 1,4-monomeric units, can be used.

In general, the amounts of polybutadiene employed for this composition are selected according to the specific uses for which the obtained composition is intended. Similarly, the intended use will also determine the given percentage of cis 1,4-addition in one polybutadiene to be used in place of a polybutadiene having a different percentage.

The production of butadiene-styrene copolymers extended with mineral oil in an amount of at least 15% by weight and having a ratio between the two types of monomeric units ranging between 13:7 and 2:3, is also known.

These copolymers, in the vulcanized state, have a high loss of hysteresis within a stated range of temperatures, which in practice coincides with the thermal conditions for normal use of the pneumatic tires.

The preparations of the mixture of elastomers, in accordance with the present invention, is carried out by means of the conventional systems known in the art. Preferably, the compounding is carried out by suitable mechanical means. To the mixture of elastomers, obtained as stated above, the usual vulcanizing agents, fillers, plasticizers and other ingredients, are then added. The so obtained composition is vulcanized and molded under the usual conditions of temperature and pressure. Of course, the ingredients may be added to either or both elastomeric components of the mixture before their compounding.

The vulcanized composition, alone or in combination with vulcanized compositions based on elastomers of another type, can constitute the whole molded article or only a part of it.

The composition based on the mixture of elastomers in accordance with the present invention and containing the suitable ingredients is advantageously used to constitute, as a vulcanized product, the tread of pneumatic tires of any kind and, besides possessing the peculiar advantageous features of cis 1,4-polybutadiene, shows a high friction coefficient, which results in a good holding of the road, even if wet, both during braking and on the curves.

Good results have also been obtained with compositions based on a mixture of elastomers comprising cis 1,4-polybutadiene and oil-extended butadiene-styrene of the above described particular type to which are added from 10 to 55 parts by weight of another elastomer, for example butadiene-styrene of the conventional type generally possessing a substantial prevalence of monomeric units originated from butadiene over monomeric units originated from styrene in a ratio by weight ranging between 9:1 and 2:1, the total of the parts by weight of the elastomeric components of the mixture being equal to 100. This copolymer may, in some cases, also be of the oil-extended type.

The expression "rubber composition," in the specification and in the claims, means the vulcanizable material not yet vulcanized, except where it is otherwise specified. The term "mixture" means instead the combination of the elastomers, on which the constitution of said "composition" is based.

Some laboratory tests and practical road tests, from which it is possible to observe the evident advantages of the composition forming the object of the present invention, are reported herebelow.

EXAMPLE

Five compositions were prepared. One of them is based on a mixture of two butadiene-styrene copolymers of the above indicated normal type, one of which is oil-extended, and said mixture is considered as a control or reference; the others are based on polybutadine containing a percentage of about 96% of cis 1,4-addition, either alone or, in accordance with the present invention, in combination with one or more other elastomers. These five compositions are reported in the following table wherein all parts are by weight:

|  | Compositions |  |  |  |  |
|---|---|---|---|---|---|
|  | A | B | C | D | E |
| Butadiene-styrene copolymer 75:25 | 40 |  |  |  |  |
| Butadiene-styrene oil-extended copolymer 75:25 (37.5 parts of oil on 100 parts of the copolymer) | 60 |  | 60 | 30 |  |
| Cis 1,4-polybutadiene (about 96% of cis 1,4-addition) |  | 100 | 40 | 40 | 40 |
| Butadiene-styrene oil-extended copolymer 60:40 (37.5 parts of oil on 100 parts of the copolymer) |  |  |  | 30 | 60 |
| Zinc oxide | 5 | 5 | 5 | 5 | 5 |
| Sulphur | 1.8 | 2.2 | 1.7 | 1.7 | 2.2 |
| N-oxydiethylene-benzothiazol 2-sulphenamide |  | 1.4 | 0.9 |  | 1.6 |
| N-cyclohexyl-2-benzothiazol sulphenamide | 1.2 |  |  | 1.1 |  |
| Antioxidants (phenyl-beta-naphthylamine and N-isopropyl-N'-phenyl-paraphenylenediamine 50:50 by weight) | 1.5 | 3 | 2.5 | 2.5 | 3 |
| Stearic acid | 1.5 | 2 | 1.7 | 1.7 | 2 |
| Mixture of selected waxes a | 1 |  |  | 1 |  |
| Mineral oil | 10 | 40 | 17 | 17 | 40 |
| ISAF black | 30 |  | 60 | 60 |  |
| HAF black | 20 | 85 |  |  | 85 | a Mixture of waxy hydrocarbons, having a melting point of 65–69° C. and a density of 0.91—produced by Witco.

The compositions A, B, C, D and E are indicated only by way of non-limiting example.

Vulcanized specimens to be used in the laboratory tests and treads for pneumatic tries to be used in the practical tests were obtained from said compositions using conventional procedures.

The laboratory tests are those relating to the resistance of the rubber to sliding on wet grounds of various types and are carried out by the skid-resistance tester which, together with the test system, is described in the Road Note No. 27 (1960) of the Road Research Laboratory (Department of Scientific and Industrial Research), Harmondsworth, Middlesex, England.

Said apparatus is used to test the behavior of the various compositions on two types of surfaces, one of which is constituted by prophyry and the other by a stoneware tile.

The values obtained from specimen A were assumed as equivalent to 100 and were taken as base index. The values obtained from the two tests on specimens B, C, D and E were referred to the base index of each test and assumed in turn the value of indices.

Both in these laboratory tests and in the practical tests which will be described herebelow, the vulcanized composition A was taken as reference.

The indices having a value higher than 100, which are obtained in the tests on the vulcanized compositions forming the object of the present invention signify very good results with respect to the vulcanized composition taken as the control or reference. However, the indices having a somewhat lower value, namely close to 100, shown in connection with compositions also forming a part of the present invention, may also be considered as desirable and positive results taking into account that these compositions, in addition to resistance to sliding, have other advantageous characteristics which are typical of the cis 1,4-butadiene on which they are based.

The laboratory tests gave the following results expressed in index values:

| Specimens | A | B | C | D | E |
|---|---|---|---|---|---|
| Resistance to sliding on a porphyry surface: Indices | 100 | 78 | 86 | 95 | 102 |
| Resistance to sliding on a stoneware tile: Indices | 100 | 77 | 90 | 96 | 102 |

The practical road tests were carried out on tires 5.60 S. 13 assembled on a motorcar weighing about 1300 kg. They were: braking on wet ground and steering pad on wet porphyry pavement.

Also in these tests, the value obtained for a tire whose tread is made with composition A was assumed as equivalent to 100 and considered as a base index, whereas the value obtained on treads constituted by other compositions was referred to the base index. In said two practical tests, the use in the tread of composition B, totally constituted by cis 1,4-polybutadiene, was excluded on account of the danger which the employment of this elastomer involved for the test.

The braking test on wet ground was carried out on smooth asphalt ground with a motorcar having the above indicated weight which, at the moment of braking, had the pre-established speed of 80 km./hr. selected in accordance with the characteristics and performance of the car.

The measurement was made on the length run by the car with the tires in sliding condition on the ground, after the real locking of the wheels subsequent to the braking; on the basis of the measurement of said length ($s$), at the preestablished speed ($v$) and with an acceleration of gravity ($g$), by applying the formula $$f = \frac{v^2}{2sg}$$

it was possible to calculate the coefficient of adherence of the tire to the ground.

The braking test on smooth wet asphalt gave the following results expressed in index values:

| Tread: | Indices |
|---|---|
| A | 100 |
| C | 93 |
| D | 100 |
| E | 106 |

The test on steering pad on wet ground serves to determine the transversal stability of the tire under test. The pad is constituted by porphyry blocks and has a circular area, the inner diameter of which is 40 meters.

The test consists in running around the pad three times in one direction and three times in the other and in measuring the times so obtained, and is repeated until the results are practically constant. Then the two smallest times obtained for each direction are considered and the average of these two times is calculated.

The time obtained for the tire in which the tread is made of the reference composition A is assumed as a base index equivalent to 100. The times obtained for the tires in which the tread is made of the other compositions C, D and E are changed into indices referred to the base index.

The test on steering pad on wet porphyry pavement gave the following results:

| Tread: | Indices |
|---|---|
| A | 100 |
| C | 89 |
| D | 109 |
| E | 115 |

What is claimed is:

1. A rubber composition based on a mixture of elastomers comprising (1) from 10 to 90 parts by weight of polybutadiene obtained by addition of 1,3-butadiene and containing monomeric units of cis 1,4-, trans 1,4- and 1,2-addition, in which the cis 1,4-addition monomeric units are present in an amount of at least 30% by weight based on the total weight of the polymer and (2) from 90 to 10 parts by weight of a butadiene-styrene copolymer extended with mineral oil, the ratio by weight between the two types of monomeric units of said copolymer being 60:40 and the oil being incorporated in an amount of at least 15% based on the total weight of the copolymer, the total of the parts by weight of the elastomeric components of the mixture being equal to 100.

2. A rubber composition as defined in claim 1, in which the mixture comprises (1) from 35 to 65 parts by weight of polybutadiene obtained by addition of 1,3-butadiene and containing monomeric units of cis 1,4-, trans 1,4- and 1,2-addition wherein at least 90% by weight of the polymer consists of cis 1,4-addition monomeric units and (2) from 65 to 35 parts by weight of a butadiene-styrene copolymer extended with minteral oil, the ratio by weight between the two types of monomeric units of said copolymer being 60:40 and the mineral oil being incorporated in said copolymer in an amount of at least 20% by weight based on the total weight of the copolymer, the total of the parts by weight of the elastomeric components of the mixture being equal to 100.

3. A composition as defined in claim 1, in which the mixture also comprises from 10 to 55 parts by weight of an additional butadiene-styrene copolymer, said copolymer containing the two types of monomeric units in the ratio by weight ranging between 49:1 and 2:1, the total of the parts by weight of the elastomeric components of the mixture being equal to 100.

4. A composition according to claim 3, wherein said additional butadiene-styrene copolymer is oil-extended.

5. A composition as defined in claim 2, in which the mixture also comprises from 10 to 55 parts by weight of an additional butadiene-styrene copolymer, said copolymer containing the two types of monomeric units in the ratio by weight ranging between 49:1 and 2:1, the total of the parts by weight of the elastomeric components of the mixture being equal to 100.

6. A composition according to claim 5, wherein said additional butadiene-styrene copolymer is oil-extended.

7. A vulcanized product comprising the composition claimed in claim 1.

8. A pneumatic tire for vehicle wheels in which at least the tread is constituted by the composition claimed in claim 1.

References Cited

Whitby, ed.: Synthetic Rubber, John Wiley & Sons, New York, 1954.

Whitby II: Synthetic Rubber, John Wiley & Sons, New York, 1954.

Brown et al.: Rubber World, November 1961, pages 71 and 72.

MORRIS LIEBMAN, *Primary Examiner.*

J. S. WALDRON, S. L. FOX, *Assistant Examiners.*

UNITED STATES PATENT OFFICE
CERTIFICATE OF CORRECTION

Patent No. 3,365,416  
January 23, 1968

Sergio Vittorelli et al.

It is hereby certified that error appears in the above numbered patent requiring correction and that the said Letters Patent should read as corrected below.

Column 3, line 18, for "9:1" read -- 49:1 --.

Signed and sealed this 8th day of April 1969.

(SEAL)  
Attest:

Edward M. Fletcher, Jr.  
Attesting Officer

EDWARD J. BRENNER  
Commissioner of Patents